United States Patent
Nakaye et al.

(10) Patent No.: US 11,300,097 B2
(45) Date of Patent: Apr. 12, 2022

(54) WIND TURBINE BLADE APPARATUS AND WIND TURBINE BLADE ATTACHMENT MEMBER

(71) Applicant: MITSUBISHI HEAVY INDUSTRIES, LTD., Tokyo (JP)

(72) Inventors: Shoeji Nakaye, Tokyo (JP); Kentaro Hayashi, Tokyo (JP); Atsushi Yuge, Tokyo (JP); Kai Karikomi, Tokyo (JP); Shinsuke Nishimura, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 85 days.

(21) Appl. No.: 16/781,327

(22) Filed: Feb. 4, 2020

(65) Prior Publication Data
US 2021/0062781 A1   Mar. 4, 2021

(30) Foreign Application Priority Data

Aug. 30, 2019 (JP) .............................. JP2019-158694

(51) Int. Cl.
*F03D 1/06* (2006.01)

(52) U.S. Cl.
CPC ...... *F03D 1/0641* (2013.01); *F05B 2240/301* (2013.01); *F05B 2250/182* (2013.01); *F05B 2260/96* (2013.01)

(58) Field of Classification Search
CPC .............. F03D 1/0641; F03D 1/0675; F05B 2240/301; F05B 2240/311; F05B 2240/3042; F05B 2250/182; F05B 2250/183; F05B 2260/96; Y02E 10/72
See application file for complete search history.

(56) References Cited

U.S. PATENT DOCUMENTS

| | | | | |
|---|---|---|---|---|
| 4,813,633 A | * | 3/1989 | Werle | F42B 10/22 244/130 |
| 4,830,315 A | * | 5/1989 | Presz, Jr | F01D 5/141 244/200 |
| 5,088,665 A | * | 2/1992 | Vijgen | B64C 23/06 244/200 |

(Continued)

FOREIGN PATENT DOCUMENTS

| | | |
|---|---|---|
| EP | 0 652 367 | 5/1995 |
| EP | 2 028 366 | 2/2009 |

(Continued)

OTHER PUBLICATIONS

Extended European Search Report dated Jul. 15, 2020 in corresponding European Patent Application No. 20155713.9.

*Primary Examiner* — David E Sosnowski
*Assistant Examiner* — Wayne A Lambert
(74) *Attorney, Agent, or Firm* — Wenderoth, Lind & Ponack, L.L.P.

(57) ABSTRACT

A wind turbine blade apparatus at least includes a wind turbine blade body, wherein a serration portion is disposed on at least on a part of a trailing edge of the wind turbine blade body, the serration portion having a saw-teeth shape where a mountain portion and a valley portion are arranged alternately in a blade longitudinal direction, and wherein a chord-directional cross section of the wind turbine blade body along a chord direction is formed to have an airfoil shape at any position in a region from the mountain portion to the valley portion.

8 Claims, 7 Drawing Sheets

(56) References Cited

U.S. PATENT DOCUMENTS

| | | | |
|---|---|---|---|
| 5,533,865 A | 7/1996 | Dassen et al. | |
| 6,830,436 B2* | 12/2004 | Shibata | F03D 1/065 |
| | | | 416/228 |
| 7,059,833 B2 | 6/2006 | Stiesdal et al. | |
| 7,918,653 B2* | 4/2011 | Standish | F03D 13/10 |
| | | | 416/228 |
| 8,414,261 B2 | 4/2013 | Bonnet | |
| 9,670,901 B2* | 6/2017 | Obrecht | F03D 1/0675 |
| 10,240,576 B2* | 3/2019 | Drack | F03D 1/0641 |
| 2009/0104038 A1* | 4/2009 | Grabau | F03D 1/0675 |
| | | | 416/219 R |
| 2013/0323070 A1* | 12/2013 | Grabau | F03D 1/0675 |
| | | | 416/229 R |
| 2015/0292476 A1* | 10/2015 | Obrecht | F03D 1/0633 |
| | | | 416/228 |

FOREIGN PATENT DOCUMENTS

| | | |
|---|---|---|
| EP | 2 667 019 | 11/2013 |
| EP | 2 921 697 | 9/2015 |
| JP | 11-201021 | 7/1999 |
| WO | 2018/103803 | 6/2018 |

* cited by examiner

WIND TURBINE BLADE APPARATUS AND WIND TURBINE BLADE ATTACHMENT MEMBER

TECHNICAL FIELD

The present disclosure relates to a wind turbine blade apparatus and a wind turbine blade attachment member.

BACKGROUND ART

For a wind turbine blade assembly to be attached to a wind turbine rotor, there has been a technique to provide a serration portion having a saw-teeth shape where mountain portions and valley portions are disposed alternately in the blade longitudinal direction on at least a part of the trailing edge of the wind turbine blade body, to suppress fluctuation of a flow at the downstream side of the wind turbine blade body and suppress broadband noise. As the above techniques, Patent Document 1 discloses a flat serration portion formed of a flat plate, and Patent Document 2 discloses a three-dimensional serration portion which is formed three dimensionally.

CITATION LIST

Patent Literature

Patent Document 1: U.S. Pat. No. 7,059,833B
Patent Document 2: U.S. Pat. No. 5,533,865A

SUMMARY

A flat serration portion may lead to deterioration of the aerodynamic performance of the wind turbine blade body, and tends to have an insufficient strength. Although having no risk of deterioration of the aerodynamic performance of the wind turbine blade body, a three-dimensional serration portion has an acute surface that does not continue to the blade surface at the deeply notched part of the valley portion. Thus, a flow passing through the acute surface generates alternate vortices, which may generate tonal sounds (noise close to pure tone).

The present disclosure was made in view of the above, and an object of the present disclosure is to solve the noise problem of a wind turbine blade apparatus including a serration portion disposed on the wind turbine blade body, without deteriorating the aerodynamic performance.

According to the present disclosure, a wind turbine blade apparatus at least includes a wind turbine blade body, wherein a serration portion is disposed on at least a part of a trailing edge of the wind turbine blade body, the serration portion having a saw-teeth shape where a mountain portion and a valley portion are arranged alternately in a blade longitudinal direction, and wherein a chord-directional cross section of the wind turbine blade body along a chord direction is formed to have an airfoil shape at any position in a region from the mountain portion to the valley portion.

Furthermore, according to the present disclosure, an attachment member for a wind turbine blade to be attached to at least a part of a trailing edge of a wind turbine blade body includes: a first-surface side wall surface to be disposed on a first surface of the wind turbine blade body; and a second-surface side wall surface to be disposed on a second surface of the wind turbine blade body, the second-surface side wall surface being connected to the first-surface side wall surface via a trailing edge portion, wherein trailing-edge portion sides of the first-surface side wall surface and the second-surface side wall surface are formed into a saw-teeth shape where a mountain portion and a valley portion are arranged alternately, and wherein a chord-directional cross section of the wind turbine blade body along a chord direction is formed to have an airfoil shape at any position in a region from the tip portion of the mountain portion to the deepest portion of the valley portion.

With the wind turbine blade apparatus and the attachment member for a wind turbine blade according to the present disclosure, it is possible to reduce broadband noise, while improving the lift-drag ratio (lift coefficient/drag coefficient) and maintaining a high aerodynamic performance. Furthermore, unlike the typical three-dimensional serration portion, it is possible to suppress occurrence of tonal sounds.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Configuration of Wind Turbine Power Generation Apparatus)

Figure 1:
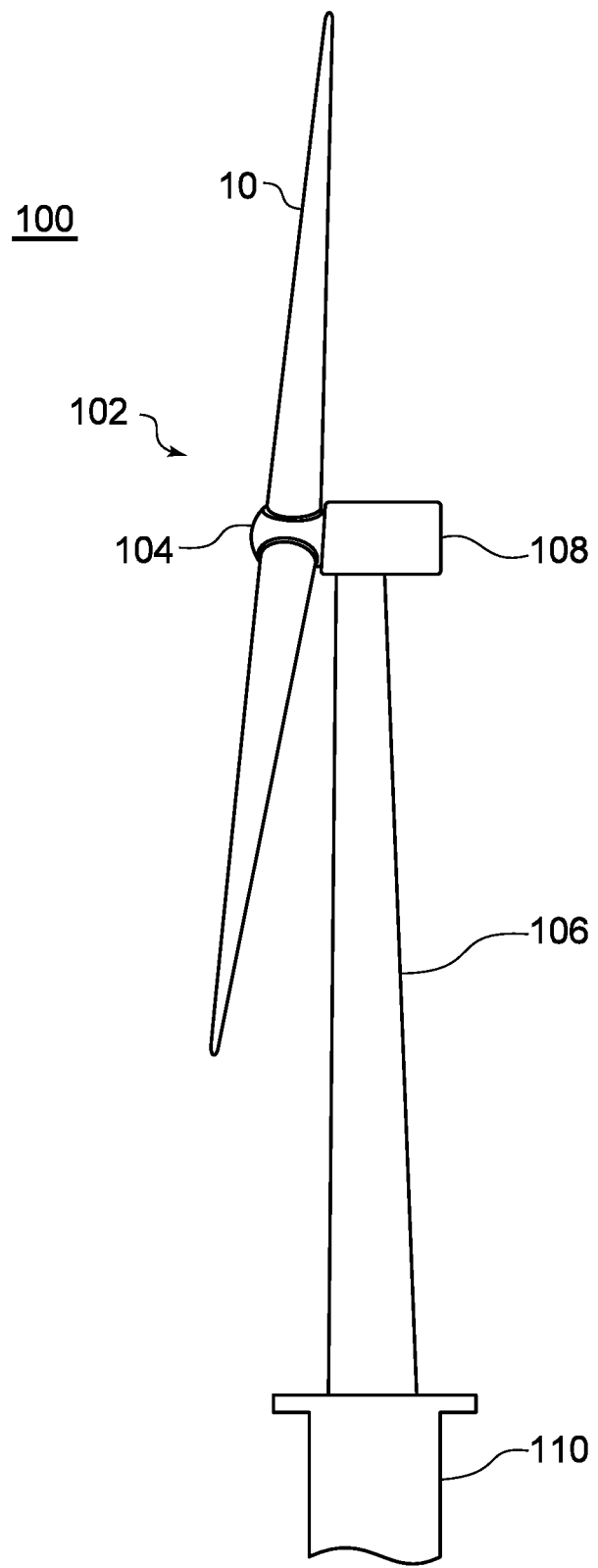
FIG. 1 is a side view of a wind turbine power generating apparatus according to an embodiment.
Figure 2:
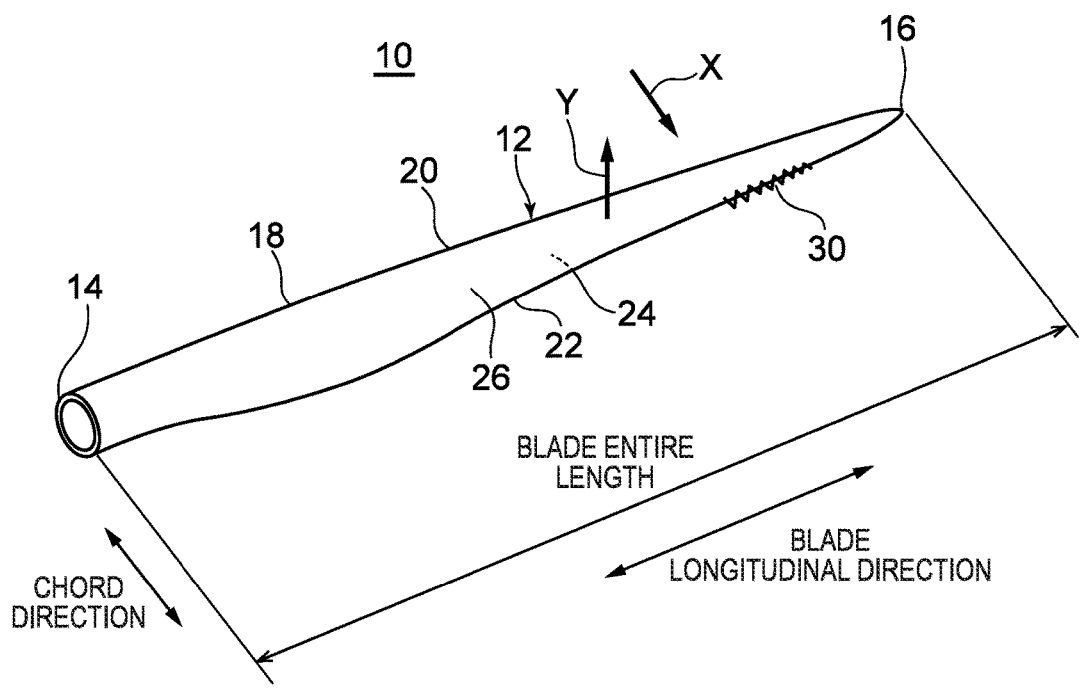
FIG. 2 is a perspective view of a wind turbine blade apparatus according to an embodiment.

FIG. 1 is a side view of a wind turbine power generating apparatus according to an embodiment. FIG. 2 is a perspective view of a wind turbine blade apparatus according to an embodiment. As depicted in FIG. 1, a wind turbine power generating apparatus 100 includes at least one (e.g. three) wind turbine blade apparatuses 10. The wind turbine blade apparatuses 10 are mounted to a hub 104 in a radial fashion, and the wind turbine blade apparatuses 10 and the hub 104 constitute a rotor 102. As the wind turbine blade apparatuses 10 receive wind, a generator (not depicted) coupled to the rotor 102 generates electric power. The rotor 102 is supported by a nacelle 108 disposed on an upper part of a tower 106. Further, the tower 106 is disposed upright on a base structure (foundation structure or a floating structure, for example) 110 disposed on water or on land.

As depicted in FIG. 2, the wind turbine blade apparatus 10 includes a wind turbine blade 12 (wind turbine blade body). The wind turbine blade 12 includes a blade root 14 to be attached to the hub 104, a blade tip 16 positioned farthest from the hub 104, and an airfoil portion 18 extending between the blade root 14 and the blade tip 16. The wind turbine blade 12 has a leading edge 20 and a trailing edge 22 from the blade root 14 to the blade tip 16. The exterior shape of the wind turbine blade 12 is formed by a first surface 24 and a second surface 26 disposed opposite to the first surface 24. The wind turbine blade apparatus 10 includes a serration portion 30 having a saw-teeth shape, on at least a part of the trailing edge 22 of the wind turbine blade 12. As depicted in FIG. 2, for instance, the serration portion 30 is disposed on the blade tip side, where the circumferential speed becomes high due to rotation of the rotor 102, and noise and deterioration of the aerodynamic performance are remarkable. When the wind flows in the direction of the arrow X and the wind turbine blade 12 receives the force of the wind and rotates in the direction of the arrow Y, the first surface 24 is the pressure surface and the second surface 26 is the suction surface.

(Configuration of Wind Turbine Blade Apparatus)

Figure 3:
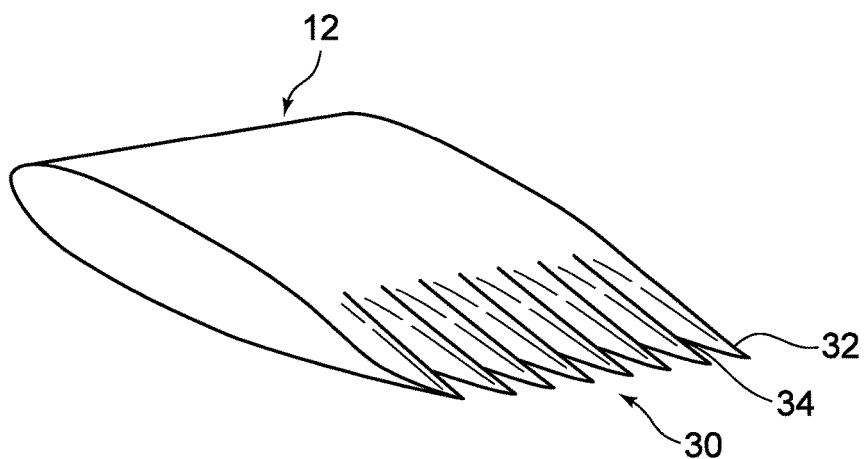
FIG. 3 is a partial perspective view of a wind turbine blade apparatus according to an embodiment.
Figure 4:
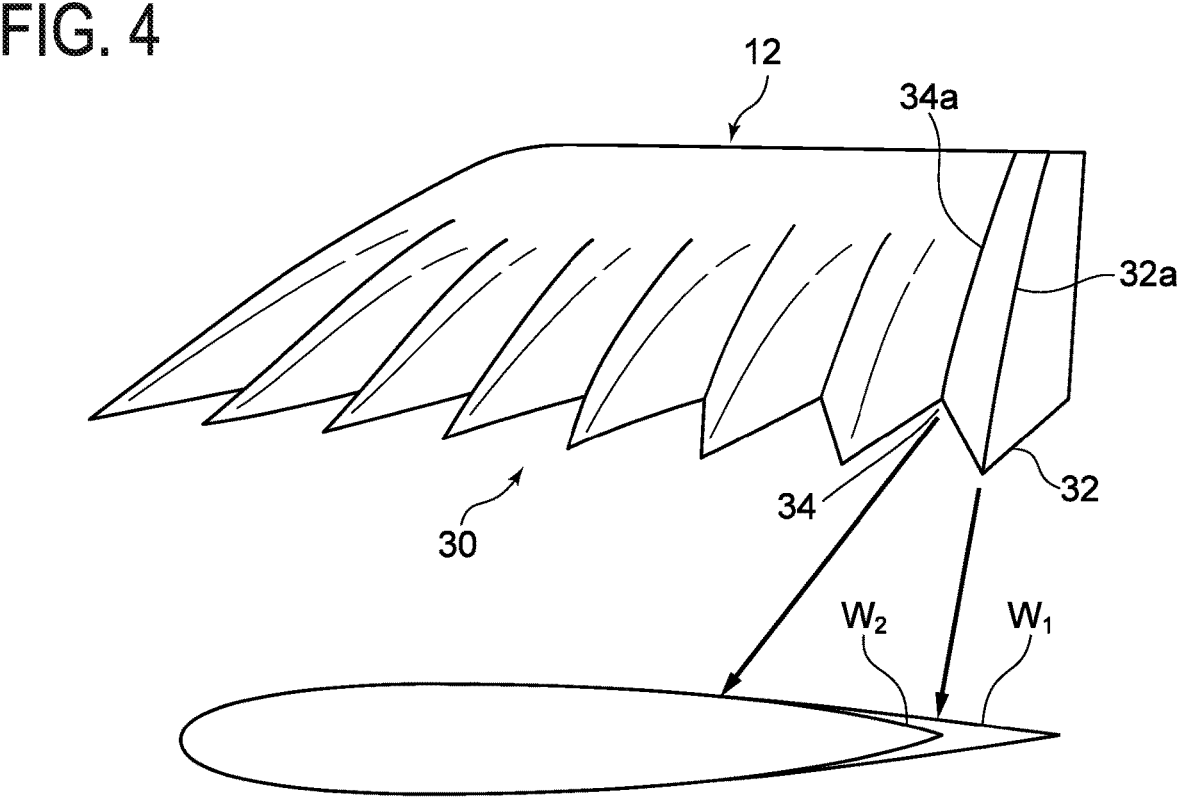
FIG. 4 is a perspective view of a serration portion according to an embodiment.

FIG. 3 is a perspective view showing a section of the wind turbine blade 12 that includes the serration portion 30 disposed on the trailing edge 22. FIG. 4 is a perspective view showing the serration portion 30. As depicted in FIG. 3, the serration portion 30 is configured to have a saw-teeth shape where a mountain portion 32 and a valley portion 34 are arranged alternately in the blade longitudinal direction on the trailing edge 22. Further, as depicted in FIG. 4, in the region from the mountain portion 32 to the valley portion 34, the chord-directional cross section along the chord direction of the wind turbine blade 12 is formed to have an airfoil shape at any position.

With the above configuration, the serration portion 30 is disposed on at least a part of the trailing edge 22 of the wind turbine blade 12, and thus the aerodynamic performance does not deteriorate, unlike the typical flat serration portion. Nevertheless, similarly to the typical three-dimensional serration portion, the lift-drag ratio can be improved and a high aerodynamic performance can be maintained. Furthermore, unlike the typical three-dimensional serration portion, there is no acute surface at the valley portion 34, and thus it is possible to suppress occurrence of tonal sounds.

In FIG. 4, $W_1$ indicates the exterior shape of the chord-directional cross section including the tip portion of the mountain portion 32 and the ridge line 32a of the mountain portion 32, and $W_2$ indicates the exterior shape of the chord-directional cross section including the valley line 34a that connects the deepest portion of the valley portion 34. The exterior shape of each of the cross sections $W_1$ and $W_2$ has an airfoil shape in the entire region of the exterior shape. Besides the above two chord-directional cross sections, a chord-directional cross section positioned between the two chord-directional cross sections has an airfoil shape in the entire region of the exterior shape. According to the embodiment depicted in FIG. 4, with any chord-directional cross section in the region from the tip portion of the mountain portion 32 to the deepest portion of the valley portion 34 being formed to have an airfoil shape, it is possible to improve the lift-drag ratio and maintain a high aerodynamic force like the typical three-dimensional serration portion, while effectively suppressing tonal sounds.

Figure 5:
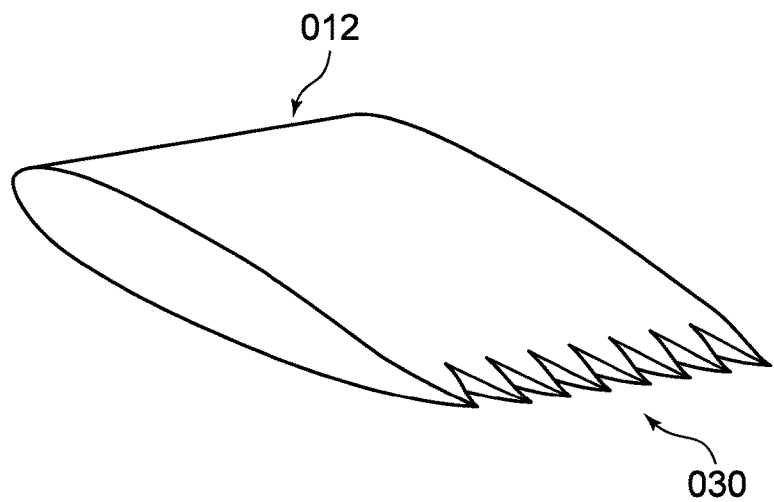
FIG. 5 is a partial perspective view of a wind turbine blade apparatus including a typical three-dimensional serration portion.
Figure 6:
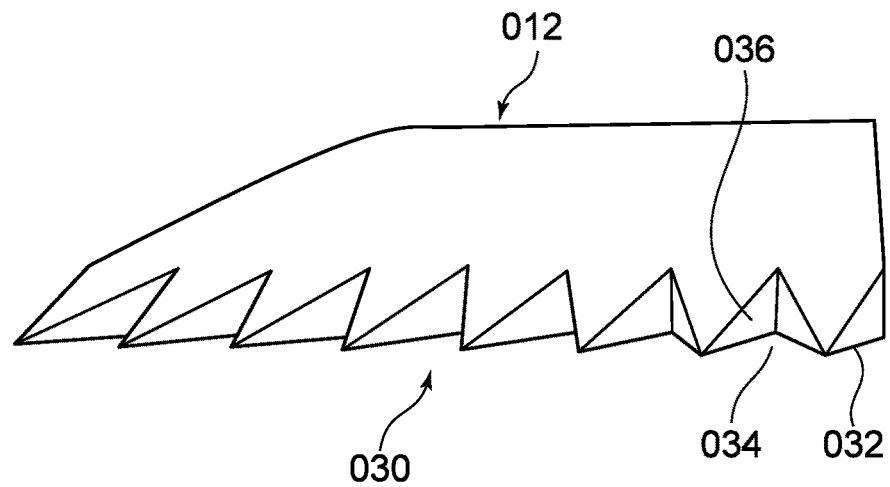
FIG. 6 is a perspective view showing a typical three-dimensional serration portion.

FIG. 5 is a perspective view showing a wind turbine blade 012 including a typical three-dimensional serration portion 030. FIG. 6 is a perspective view showing the serration portion 030. A typical three-dimensional serration portion 030 does not have an airfoil shape over the entire region of the chord-directional cross section, unlike the above serration portion 30. That is, only the chord-directional cross section passing through the tip portion of the mountain portion 032 has an airfoil shape, and the chord-directional cross section passing through the other region includes a surface 036 of an acute flat shape that does not form an airfoil shape. Thus, when wind passes through the surface 036, tonal sounds are generated.

In the present specification, "airfoil shape" refers to a shape whose thickness changes gradually in the chord-directional cross section of the wind turbine blade 12, and has no section where the thickness changes discontinuously like the surface 036 of the serration portion 030. That is, "airfoil shape" is a shape whose thickness changes continuously. In other words, "airfoil shape" is a shape that does not have discontinuous points for which two different tangents can be set, except for the leading edge and the trailing edge, on the outer shape of the chord-directional cross section. Accordingly, the flow passing through the trailing-edge side portion of the wind turbine blade 12 is not disturbed, and thus it is possible to suppress occurrence of tonal sounds.

Figure 7:
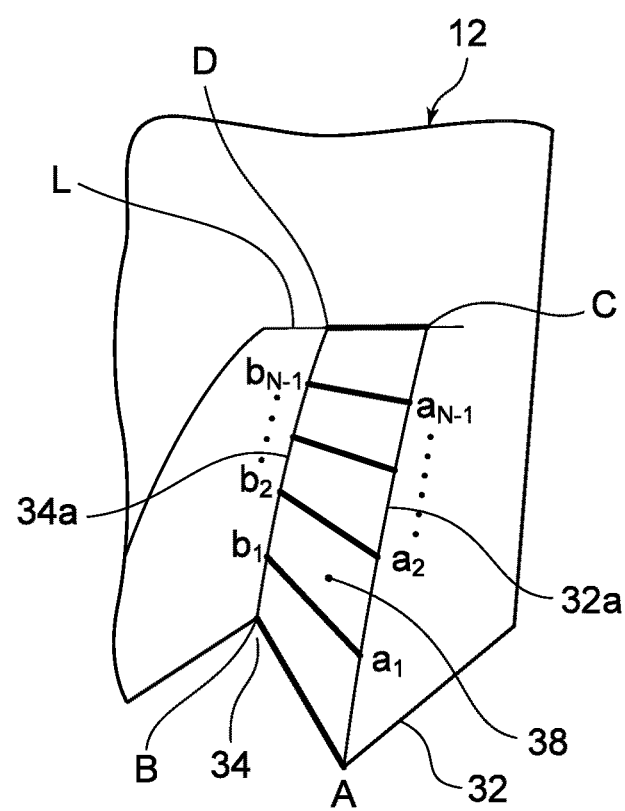
FIG. 7 is an explanatory diagram for explaining a method for obtaining a configuration surface of a serration portion.

Next, with reference to FIG. 7, a method for setting the shape of the surface 38 between the ridge line 32a and the valley line 34a of the serration portion 30 will be described. The drawing shows a chord-directional cross section of the trailing edge 22 before the ridge line 32a forms the serration portion 30. When the trailing edge 22 corresponding to the valley portion 34 is notched to form the valley portion 34, the line L indicates a portion where the chord-directional cross sections before and after notching are in contact with one another in the region between the ridge line 32a and the valley line 34a. Herein, A indicates the tip portion of the mountain portion 32, and B indicates the deepest portion of the valley portion 34. Furthermore, C indicates the intersection between the ridge line 32a and the line L, and D indicates the intersection between the valley line 34a and the line L.

First, the ridge line 32a between A and C and the valley line 34a between B and D are each divided equally into N parts, thereby forming points $a_1, a_2, \ldots, a_{N-1}$, and $b_1, b_2, \ldots, b_{N-1}$. Next, lines connecting the above respective points $a_1b_1, a_2b_2, \ldots, a_{N-1}b_{N-1}$ are drawn on the surface 38, and the surface between the ridge line 32a and the valley line 34a is determined, where N is infinite ($\infty$).

(Configuration of Attachment Member for Wind Turbine Blade)

Figure 8:
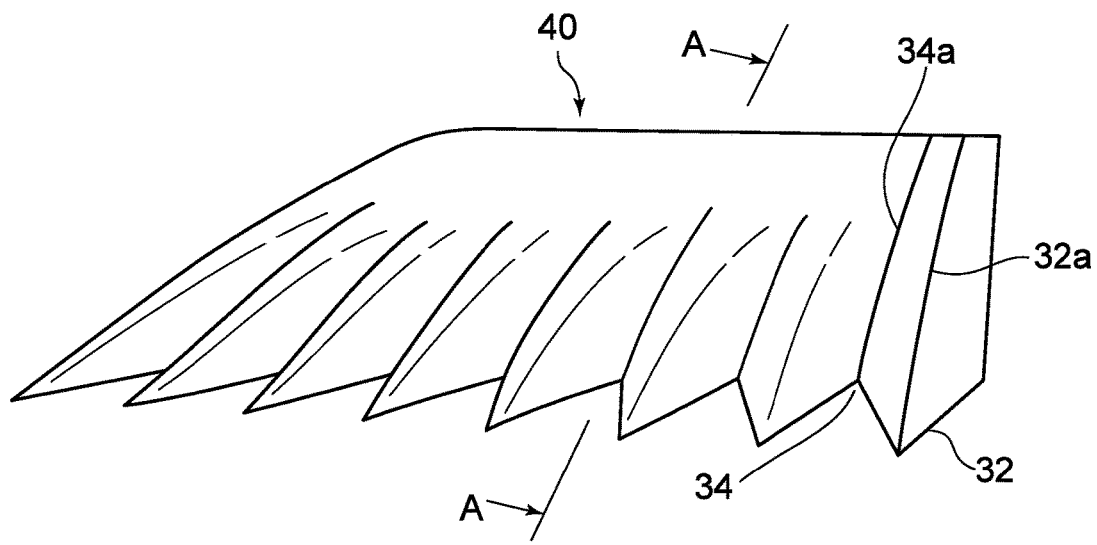
FIG. 8 is a perspective view showing an attachment member for a wind turbine blade according to an embodiment.
Figure 9:
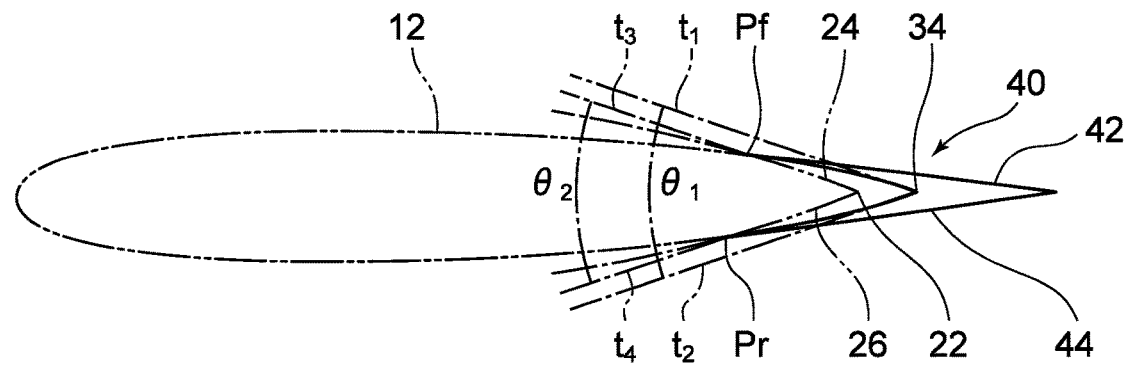
FIG. 9 is a schematic cross-sectional view taken along line A-A in FIG. 8.

FIG. 8 is a perspective view showing an attachment member 40 being a single member according to an embodiment (attachment member for a wind turbine blade). FIG. 9 is a schematic cross-sectional view taken along line A-A in FIG. 8. The serration portion 30 is configured as an attachment member 40 to be attached to at least a part of the trailing edge 22 of the wind turbine blade 12. Accordingly, it is possible to form the serration portion 30 as needed, on the trailing edge 22 of the wind turbine blade 12 that does not have the serration portion 30.

In an embodiment, as depicted in FIG. 8, the attachment member 40 includes a first-surface side wall surface 42 to be disposed on the first surface 24 of the wind turbine blade 12, and a second-surface side wall surface 44 to be disposed on the second surface 26 of the wind turbine blade 12. The second-surface side wall surface 44 is connected to the first-surface side wall surface 42 via the trailing edge portion. The attachment member 40 is attached to the wind turbine blade 12 so as to cover the trailing edge portion of the wind turbine blade 12. With the attachment member 40 disposed so as to sandwich the trailing edge portion of the wind turbine blade 12 with the first-surface side wall surface 42 and the second-surface side wall surface 44 from both sides, it is possible to provide the serration portion 30 for the trailing edge 22 that does not have the serration portion 30. Accordingly, it is possible to provide the serration portion 30 as needed, on the trailing edge 22 of the wind turbine blade 12 that does not have the serration portion 30. Furthermore, since the first-surface side wall surface 42 and the second-surface side wall surface 44 of the attachment member 40 serve as the blade surfaces of the wind turbine blade 12, the aerodynamic performance of the wind turbine blade 12 is not deteriorated.

In an embodiment, as depicted in FIG. 9, the tip portion of the first-surface side wall surface 42 is positioned at the point Pf, and is joined to the first surface 24 of the wind turbine blade 12 at the point Pf. Furthermore, the tip portion of the second-surface side wall surface 44 is positioned at the point Pr, and is joined to the second surface 26 at the point Pr. In an embodiment, the point Pf coincides with the line L depicted in FIG. 7 in the chord direction.

In an embodiment, as depicted in FIG. 9, the angle $\theta_1$ formed between the tangent $t_1$ to the deepest portion of the valley portion 34 at the side of the first surface 24 and the tangent $t_2$ to the deepest portion of the valley portion 34 at the side of the second surface 26 is not greater than 45 angular degrees. Accordingly, the tonal sounds are suppressed, and thereby it is possible to improve the effect of the serration portion 30 to reduce broadband noise. Preferably, the angle $\theta_1$ is not greater than 35 angular degrees, and more preferably, 30 angular degrees. Accordingly, it is possible to improve the effect to reduce noise even further. Moreover, at the trailing edge 22 of the original wind turbine blade 12, the angle formed between the tangent $t_3$ at the side of the first surface 24 and the tangent $t_4$ at the side of the second surface 26 is $\theta_2$. In a case where a wind turbine blade 12 without the serration portion 30 is notched to form the serration portion 30, the lower limit value of the angle $\theta_1$ is the angle $\theta_2$ of the trailing edge 22 of the original wind turbine blade 12. In a case where the serration portion 30 is formed by attaching the attachment member 40 to a trailing-edge side of a wind turbine blade 12 without the serration portion 30 while the wind turbine blade 12 is not notched, the upper limit value of the angle $\theta_1$ is the angle $\theta_2$ of the trailing edge 22 of the original wind turbine blade 12.

In an embodiment, the first surface 24 of the wind turbine blade 12 has a convex surface, and the second surface 26 has a convex surface. In another embodiment, the first surface 24 of the wind turbine blade 12 has a convex surface, and the second surface 26 has a concave surface.

In an embodiment, the attachment member 40 is formed of a material that has a flexibility that is equal to or higher than that of the wind turbine blade 12. As the attachment member 40, for instance, a weather-resistant and durable rubber material such as ethylene propylene diene monomer (EPDM), and urethane, or a sponge material may be used.

Accordingly, even when the wind turbine blade 12 is twisted in response to wind and has warp or tension, the attachment member 40 can also deform so as to conform to the deformation of the wind turbine blade 12. Thus, it is possible to improve the weather resistant performance and the load durability of the attachment member 40, and thereby it is possible to prevent breakage of the serration portion 30 and separation of the serration portion 30 from the wind turbine blade 12. Furthermore, there is no clearance between the wind turbine blade 12 and the attachment member 40, and thus it is possible to suppress occurrence of new noise due to the flow around such clearance.

The elastic modulus (Young's modulus) can be used as an index of the flexibility of the material of the attachment member 40. The Young's modulus of the material that can be applied to the attachment member 40 may be equal to or not higher than the Young's modulus of the material constituting the wind turbine blade 12.

(Analysis Result)

Hereinafter, the result of analysis conducted by the present inventors and the like will be described. When the lift-drag ratio (lift coefficient/drag coefficient) is compared between a wind turbine blade without the serration portion and the wind turbine blade 12 having the serration portion 30, the lift-drag ratio of the wind turbine blade without the serration portion 30 is 28.9, and the lift-drag ratio of the wind turbine blade 12 having the serration portion 30 is 29.8, which indicates improvement of the lift-drag ratio.

Figure 10A:
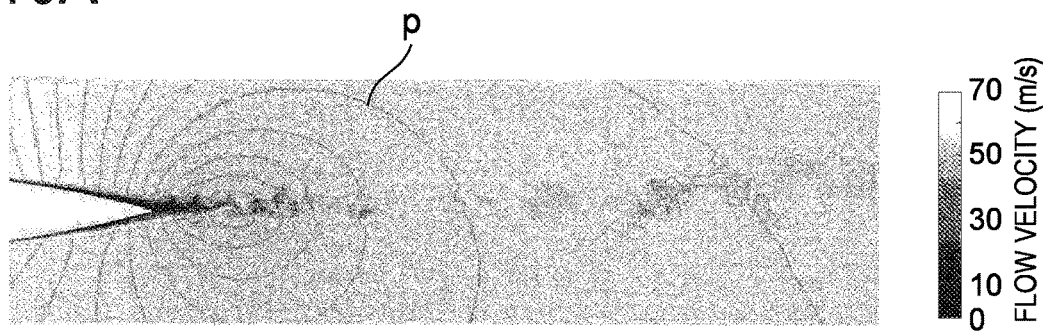
FIG. 10A is a distribution diagram showing the flow at the downstream side of a wind turbine blade apparatus according to an embodiment.
Figure 10B:
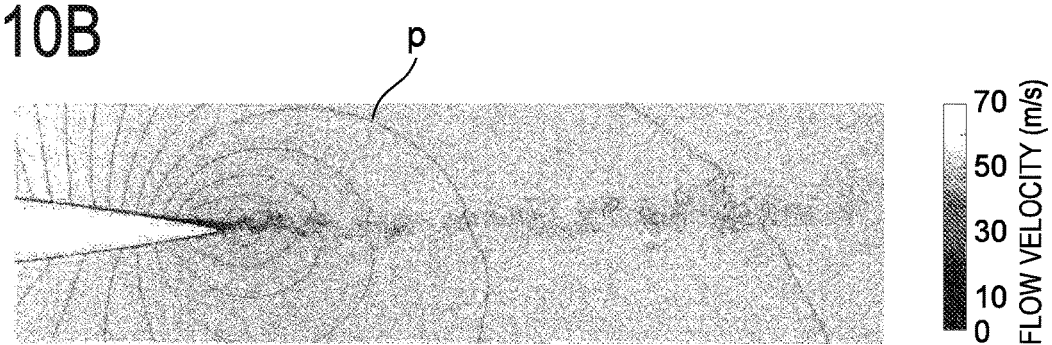
FIG. 10B is a distribution diagram showing the flow at the downstream side of a wind turbine blade apparatus according to an embodiment.
Figure 10C:
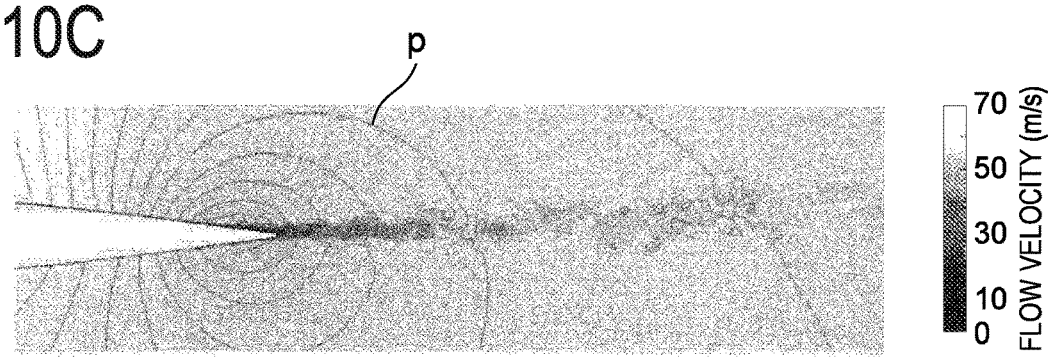
FIG. 10C is a distribution diagram showing the flow at the downstream side of a wind turbine blade apparatus according to an embodiment.
Figure 11A:
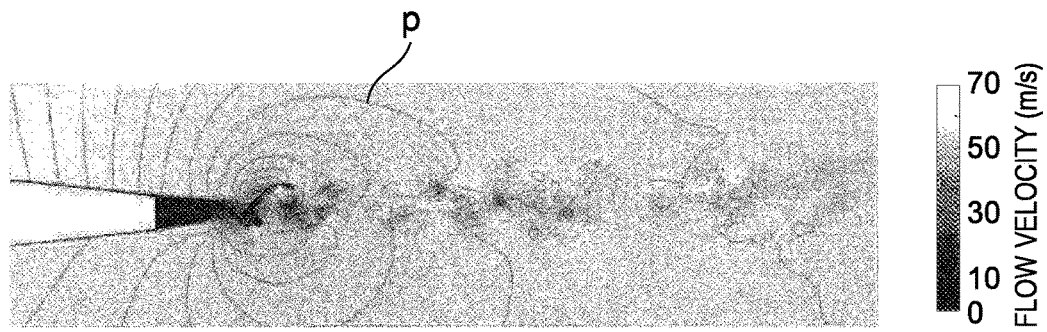
FIG. 11A is a distribution diagram showing the flow at the downstream side of a wind turbine blade apparatus that includes a typical three-dimensional serration portion.
Figure 11B:
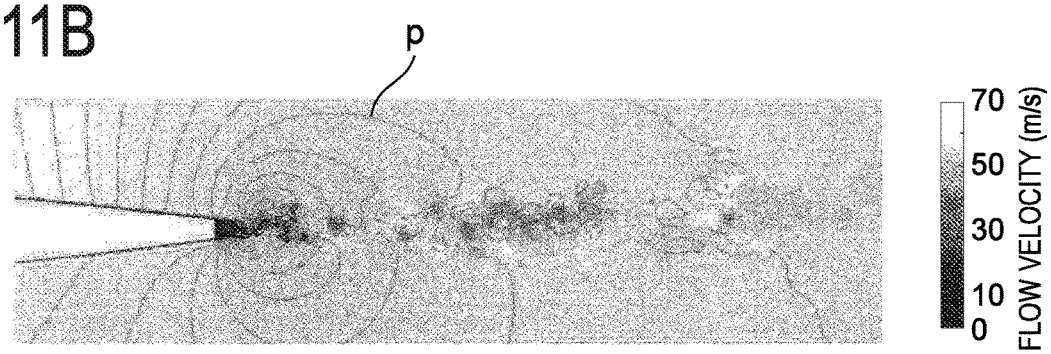
FIG. 11B is a distribution diagram showing the flow at the downstream side of a wind turbine blade apparatus that includes a typical three-dimensional serration portion.
Figure 11C:
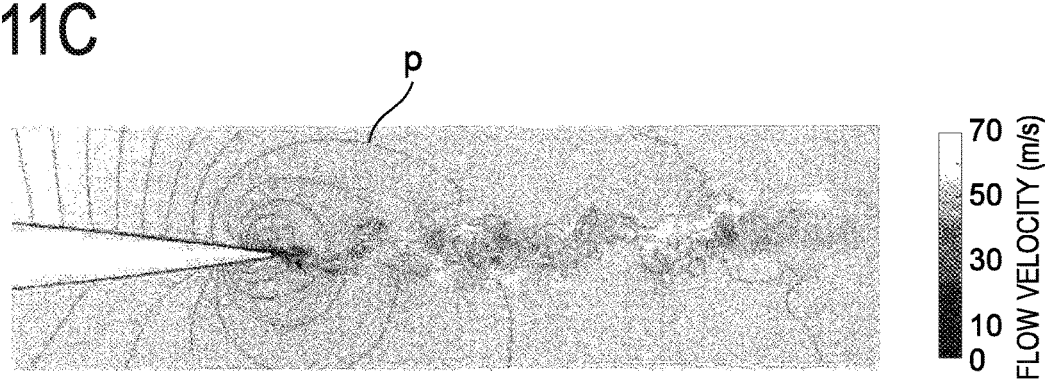
FIG. 11C is a distribution diagram showing the flow at the downstream side of a wind turbine blade apparatus that includes a typical three-dimensional serration portion.

FIGS. 10A to 10C are analysis results showing the flow-velocity distribution and the pressure distribution of the flow of wind at the serration portion 30, for the wind turbine blade 12 having the serration portion 30. FIGS. 11A to 11C are analysis results showing the flow-velocity distribution and the pressure distribution of the flow of wind at the serration portion 030, for the wind turbine blade 012 having the typical three-dimensional serration portion 030. FIGS. 10A and 11A show the analysis result of the flow in the chord-directional cross section including the valley line 34a. FIGS. 10C and 11C show the analysis result of the flow in the chord-directional cross section including the ridge line 32*a*. FIGS. 10B and 11B show the analysis result of the flow in the chord-directional cross section between the valley line 34*a* and the ridge line 32*a*. In the above drawings, the line 'p' is the isobaric line.

From the above drawings, it can be seen that the vortices emitted from the serration portion 30 are more reduced than the vortices emitted from the typical three-dimensional serration portion 030. Thus, it can be also confirmed that noise such as tonal sounds is also reduced.

The contents described in the above respective embodiments can be understood as follows, for instance.

(1) According to an embodiment, a wind turbine blade apparatus (the wind turbine blade apparatus 10 depicted in FIG. 2, for instance) at least includes a wind turbine blade body, wherein a serration portion (the serration portion 30 depicted in FIGS. 2 to 4, for instance) is disposed on at least on a part of a trailing edge of the wind turbine blade body, the serration portion having a saw-teeth shape where a mountain portion and a valley portion are arranged alternately in a blade longitudinal direction, and wherein a chord-directional cross section (the chord-directional cross sections $W_1$ and $W_2$ depicted in FIG. 4, for instance) of the wind turbine blade body along a chord direction is formed to have an airfoil shape at any position in a region from the mountain portion to the valley portion.

With the above configuration, the chord-directional cross section along the chord direction of the wind turbine blade body is formed to have an airfoil shape at any position in the region from the tip portion of the mountain portion to the deepest portion of the valley portion, and thus the aerodynamic performance does not deteriorate unlike the typical three-dimensional serration portion, and it is possible to improve the lift-drag ratio and maintain a high aerodynamic force like the typical three-dimensional serration portion. Furthermore, unlike the typical three-dimensional serration portion, there is no acute portion at the valley portion, and thus it is possible to suppress occurrence of tonal sound.

(2) According to another embodiment, the wind turbine blade apparatus according to the above (1) is configured such that the airfoil shape is formed in a region from a tip portion of the mountain portion to a deepest portion of the valley portion.

With the above configuration, it is possible to improve the lift-drag ratio and maintain a high aerodynamic force like the typical three-dimensional serration portion, while effectively suppressing occurrence of tonal sounds.

(3) According to yet another embodiment, the wind turbine blade apparatus according to claim (1) or (2) is configured such that the airfoil shape is a shape whose thickness changes continuously in the chord-directional cross section.

With the above configuration, the flow passing through the trailing-edge side portion of the wind turbine blade 12 is not disturbed, and thus it is possible to suppress occurrence of tonal sounds.

(4) According to another embodiment, the wind turbine blade apparatus according to any one of the above (1) to (3) is configured such that the serration portion is configured as an attachment member (the attachment member 40 depicted in FIG. 8, for instance) to be attached to at least a part of the trailing edge of the wind turbine blade body.

With the above configuration, by attaching the attachment member as needed to the trailing edge of a wind turbine blade body that does not include the serration portion, it is possible to achieve the above advantageous effect.

(5) According to yet another embodiment, the wind turbine blade apparatus according to the above (4) is configured such that the attachment member includes: a first-surface side wall surface (the first-surface side wall surface 42 depicted in FIG. 4, for instance) to be disposed on a first surface of the wind turbine blade body; and a second-surface side wall surface (the second-surface side wall surface 44 depicted in FIG. 4, for instance) to be disposed on a second surface of the wind turbine blade body, the second-surface side wall surface being connected to the first-surface side wall surface via a trailing edge portion, and the attachment member is configured to be attached to the wind turbine blade body so as to cover a trailing-edge side portion of the wind turbine blade body.

With the above configuration, the attachment member for a wind turbine blade can be easily attached to the trailing edge of the wind turbine blade body, by sandwiching the trailing-edge side portion of the wind turbine blade body without the serration portion with the first-surface side wall surface and the second-surface side wall surface from both sides. Furthermore, since the first-surface side wall surface and the second-surface side wall surface of the attachment member for a wind turbine blade serve as the blade surfaces of the wind turbine blade, the aerodynamic performance of the wind turbine blade is not deteriorated.

(6) According to yet another embodiment, the wind turbine blade apparatus according to any one of the above (1) to (5) is configured such that an angle formed between a tangent (the tangent $t_1$ depicted in FIG. 4, for instance) to a deepest portion of the valley portion (the valley portion 34, for instance) at the side of a first surface and a tangent (the tangent $t_2$ depicted in FIG. 4, for instance) to the deepest portion of the valley portion at the side of a second surface is not greater than 45 angular degrees.

With the above configuration, the angle formed between the tangent to the deepest portion of the valley portion at the side of the first surface and the tangent to the deepest portion of the valley portion at the side of the second surface is not greater than 45 angular degrees, and thereby it is possible to reduce broadband noise.

(7) According to an embodiment, an attachment member for a wind turbine blade to be attached to at least a part of a trailing edge of a wind turbine blade body includes: a first-surface side wall surface to be disposed on a first surface of the wind turbine blade body; and a second-surface side wall surface to be disposed on a second surface of the wind turbine blade body, the second-surface side wall surface being connected to the first-surface side wall surface via a trailing edge portion, wherein trailing-edge portion sides of the first-surface side wall surface and the second-surface side wall surface are formed into a saw-teeth shape where a mountain portion and a valley portion are arranged alternately, and wherein a chord-directional cross section of the wind turbine blade body along a chord direction is formed to have an airfoil shape at any position in a region from the mountain portion to the valley portion.

With the above configuration, the wind turbine blade attachment member can be easily attached to the trailing edge of the wind turbine blade body without the serration portion, by sandwiching the trailing edge of the wind turbine blade body with the first-surface side wall surface and the second-surface side wall surface from both sides. Accordingly, it is possible to provide the serration portion as needed, on the trailing edge of the wind turbine blade body that does not have the serration portion.

(8) According to another embodiment, the attachment member for a wind turbine blade includes a material having a flexibility which is equal to or higher than that of the wind turbine blade body.

With the above configuration, the attachment member for a wind turbine blade is formed of a material having a flexibility that is equal to or higher than that of the wind turbine blade body, and thus the attachment member for a wind turbine blade is capable of deforming so as to conform to the twist and tension of the wind turbine blade body in response to wind, and thereby it is possible to improve the durability.

The invention claimed is:

1. A wind turbine blade apparatus comprising:
a wind turbine blade body,
wherein a serration portion is disposed on at least on a part of a trailing edge of the wind turbine blade body, the serration portion having a saw-teeth shape where a mountain portion and a valley portion are arranged alternately in a blade longitudinal direction,
wherein each of a ridge line of the mountain portion and a valley line of the valley portion, which connects adjacent serrations of the serration portions, is configured to extend along a chord direction of the wind turbine blade body, and
wherein a chord-directional cross section of the wind turbine blade body along the chord direction is formed to have an airfoil shape at any position in a region from the ridge line of the mountain portion to the valley line of the valley portion.

2. The wind turbine blade apparatus according to claim 1, wherein the airfoil shape is formed in a region from a tip portion of the mountain portion to a deepest portion of the valley portion.

3. The wind turbine blade apparatus according to claim 1, wherein the airfoil shape is a shape whose thickness changes continuously in the chord-directional cross section.

4. The wind turbine blade apparatus according to claim 1, wherein the serration portion is configured as an attachment member to be attached to at least a part of the trailing edge of the wind turbine blade body.

5. The wind turbine blade apparatus according to claim 4, wherein the attachment member includes:
a first-surface side wall surface to be disposed on a first surface of the wind turbine blade body; and
a second-surface side wall surface to be disposed on a second surface of the wind turbine blade body, the second-surface side wall surface being connected to the first-surface side wall surface via a trailing edge portion, and
wherein the attachment member is configured to be attached to the wind turbine blade body so as to cover a trailing-edge side portion of the wind turbine blade body.

6. The wind turbine blade apparatus according to claim 1, wherein an angle formed between a tangent to a deepest portion of the valley portion at the side of a first surface and a tangent to the deepest portion of the valley portion at the side of a second surface is not greater than 45 angular degrees.

7. An attachment member for a wind turbine blade to be attached to at least a part of a trailing edge of a wind turbine blade body, the attachment member comprising:
a first-surface side wall surface to be disposed on a first surface of the wind turbine blade body; and
a second-surface side wall surface to be disposed on a second surface of the wind turbine blade body, the second-surface side wall surface being connected to the first-surface side wall surface via a trailing edge portion,
wherein trailing-edge portion sides of the first-surface side wall surface and the second-surface side wall surface are formed into a saw-teeth shape where a mountain portion and a valley portion are arranged alternately,
wherein each of a ridge line of the mountain portion and a valley line of the valley portion, which connects adjacent teeth of the saw-teeth shape, is configured to extend along the chord direction of the wind turbine blade body, and
wherein a chord-directional cross section of the wind turbine blade body along the chord direction is formed to have an airfoil shape at any position in a region from the ridge line of the mountain portion to the valley line of the valley portion.

8. The attachment member for the wind turbine blade according to claim 7, wherein the attachment member for a wind turbine blade comprises a material having a flexibility which is equal to or higher than that of the wind turbine blade body.

* * * * *